(12) United States Patent
Hong et al.

(10) Patent No.: US 8,103,077 B2
(45) Date of Patent: Jan. 24, 2012

(54) METHOD AND SYSTEM FOR LOCATING OPAQUE REGIONS IN CHEST X-RAY RADIOGRAPHS

(75) Inventors: Lin Hong, Monmouth Junction, NJ (US); Ying Li, Highland Park, NJ (US); Hong Shen, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 1056 days.

(21) Appl. No.: 11/951,372

(22) Filed: Dec. 6, 2007

(65) Prior Publication Data

US 2008/0181481 A1 Jul. 31, 2008

Related U.S. Application Data

(60) Provisional application No. 60/869,356, filed on Dec. 11, 2006.

(51) Int. Cl.
*G06K 9/00* (2006.01)
(52) U.S. Cl. ........ 382/132; 382/128; 382/131; 382/287; 382/291; 382/293
(58) Field of Classification Search .................. 382/128, 382/131, 132, 287, 289, 291, 293
See application file for complete search history.

(56) References Cited

U.S. PATENT DOCUMENTS

| 6,055,326 | A * | 4/2000 | Chang et al. ................. 382/132 |
| 6,475,149 | B1 | 11/2002 | Sumanaweera |
| 6,793,496 | B2 | 9/2004 | Edic et al. |
| 2006/0013482 | A1* | 1/2006 | Dawant et al. ................ 382/173 |

FOREIGN PATENT DOCUMENTS

JP 02220638 A * 9/1990

OTHER PUBLICATIONS

Campadelli, Paola, et al., "Lung Segmentation and Nodule Detection in Postero Anterior Chest Radiographs," *Proc. Gruppo Italiano Ricercatori in Pattern Recognition*, (2004).
Freedman, Matthew, "State-of-the-Art Screening for Lung Cancer (Part 1): the Chest Radiography," *Thorax Surg Clin*, (2004) 14.
Park, Mira, et al., "Automatic Extraction of Lung Boundaries by a Knowledge-Based Method," *Pan Syndey Workshop on Visual Information Processing*, (2001) Australia.
Van Ginneken, Bram, et al., "Computer-Aided Diagnosis in Chest Radiography: A Survey," *IEEE Transactions on Medical Imaging*, (2001) 20:12.

* cited by examiner

*Primary Examiner* — Robert Kim
*Assistant Examiner* — Michael Logie

(57) ABSTRACT

A method and system for locating an opaque region, such as a heart region in a chest X-ray radiograph is disclosed. In order to segment a heart region in a chest X-ray radiograph, a heart region boundary is generated based on lung boundaries in the chest X-ray radiograph and an average heart region model. A location of the lower boundary of the heart region in the chest X-ray radiograph is then determined. Left and right portions of the heart region boundary are independently registered to corresponding portions of the lung boundaries, and upper and lower portions of the heart region boundary are adjusted based on the left and right portions in order to form a smooth contour.

25 Claims, 11 Drawing Sheets

METHOD AND SYSTEM FOR LOCATING OPAQUE REGIONS IN CHEST X-RAY RADIOGRAPHS

This application claims the benefit of U.S. Provisional Application No. 60/869,356, filed Dec. 11, 2006, the disclosure of which is herein incorporated by reference.

BACKGROUND OF THE INVENTION

The present invention relates to locating an opaque region in a chest X-ray radiograph, and more particularly, to locating an opaque region representing the heart in a chest X-ray radiograph, for nodule detection in the heart region.

Nodules are small masses of tissue, which can form on various organs in the human body, such as the lungs. Lung nodule detection can be used for advance cancer screening. Accordingly, computer implemented methods for automatic nodule detection methods have been developed to detect nodules in chest X-ray radiographs. Such automatic nodule detection methods determine locations in a chest X-ray radiograph at which there is a high probability that a nodule exists.

In chest X-ray radiographs, the heart appears as an opaque region with different image characteristics from the lung regions. Since the heart region has different image characteristics from the lung regions, the heart region should be processed using a different nodule detection method than the lung regions. However, in order to process the heart region using a specialized nodule detection method, it is first necessary to segment, or determine a boundary of, the heart region in the chest x-ray radiograph. Accordingly, a method for segmenting an opaque region representing the heart in a chest X-ray radiograph is needed.

BRIEF SUMMARY OF THE INVENTION

The present invention provides a method for locating an opaque region representing the heart region in a chest X-ray radiograph. Embodiments of the present invention can be used to directly segment the heart region in an X-ray radiograph. The segmented heart region can be used in nodule detection applications, for example to process the heart region separately from the lung regions.

In one embodiment of the present invention, a heart region is segmented from a chest X-ray radiograph. In order to segment the heart region, a heart region boundary is generated based on lung boundaries in the chest X-ray radiograph and an average heart region model. A location of the lower boundary of the heart region in the chest X-ray radiograph is then determined. The location of the lower boundary can be determined by detecting lines in the chest X-ray radiograph using a Hough transform. Left and right portions of the heart region boundary are independently registered to corresponding portions of the lung boundaries, and upper and lower portions of the heart region boundary are adjusted based on the left and right portions in order to form a smooth contour.

These and other advantages of the invention will be apparent to those of ordinary skill in the art by reference to the following detailed description and the accompanying drawings.

DETAILED DESCRIPTION

The present invention is directed to a method for determining a location of an opaque region in an X-ray radiograph. Embodiments of the present invention are described herein to give a visual understanding of the segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention are directed to segmenting an opaque heart region in a chest X-ray radiograph. The segmentation of the heart region, according to embodiments of the present invention, is based in part on boundaries of the lungs acquired using a lung segmentation method. Various methods for segmenting lungs in an X-ray radiograph are well known. Accordingly, the embodiments of the present invention described below assume that lung regions in an input image (chest x-ray radiograph) are already segmented. The heart region in the image is then segmented based in part on the boundaries of the lung regions, and the heart and lung regions can be processed using separate nodule detection methods to detect nodules in the heart and lung regions.

Figure 1:
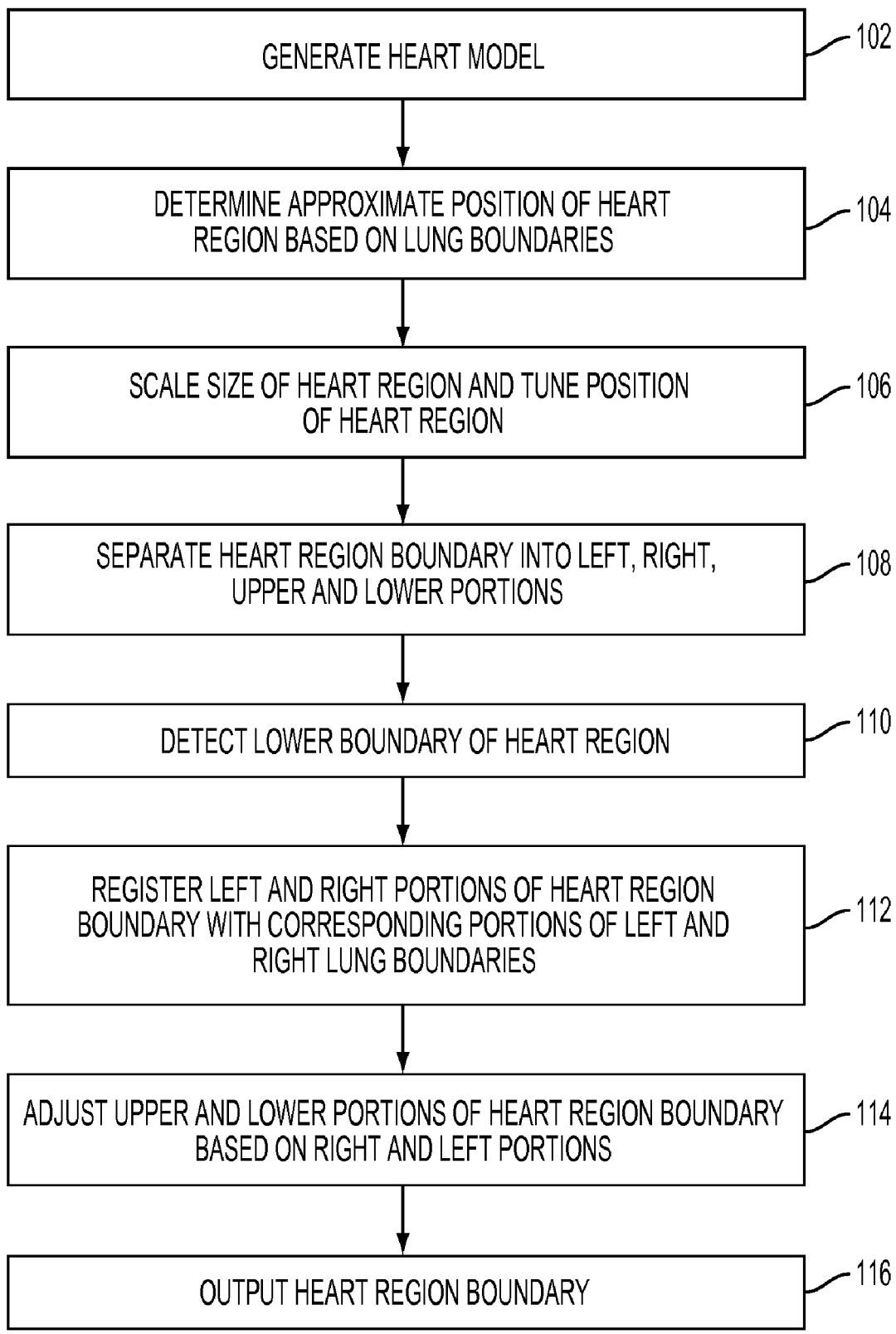
FIG. 1 illustrates a method of segmenting a heart region in a chest X-ray radiograph according to an embodiment of the present invention.
Figure 2:
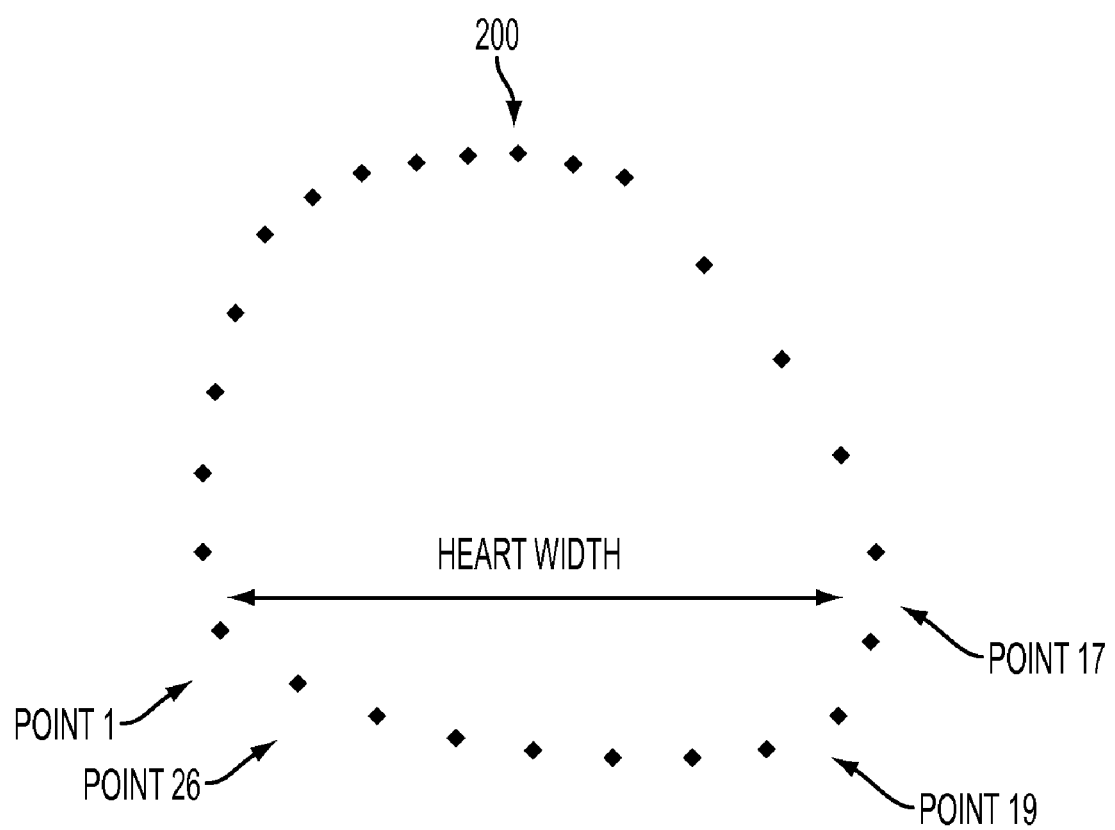
FIG. 2 illustrates a heart model representing a mean heart shape.

FIG. 1 illustrates a method of segmenting a heart region in a chest X-ray radiograph according to an embodiment of the present invention. At step 102, a heart model is generated. Since the shape of the heart is similar in different patients, a heart model can be generated based on prior knowledge of the heart shape. The heart model can be generated as a mean shape of known heart regions in chest X-ray radiographs. FIG. 2 illustrates a heart model 200 representing a mean heart shape. As illustrated in FIG. 2, the heart can be modeled using a plurality of points forming a heart boundary. Each point of the heart model 200 can be identified by a number starting with point 1 and counting clockwise around the heart boundary to a final point (point 26). The heart model 200 represents an average size heart having an average heart width. The heart model can be generated based on training data and stored in a memory or storage of a computer system prior heart region segmentation of each individual patient.

Returning to FIG. 1, at step 104, an approximate position of the heart region is determined based on the lung boundaries in the chest X-ray radiograph. The approximate position of the heart region is determined based on the lung boundaries, and an initial heart region boundary is generated at the approximate position of the heart region using the heart model. The lung boundaries form two lung contours, lung contour 1 and lung contour 2, which represent the left and right lungs, respectively. As used herein, left and right refer to how the lungs and heart appear in an image, i.e., the left lung refers the lung on the left side of the image. In order to determine the approximate position for the initial heart region boundary, a corner is identified on each of lung contour 1 and lung contour 2. The corner on each lung contour is a point at the lower inner boundary of the contour at which the angle between the contour boundary in either direction from that point is the smallest. The corners are obtained based on the point position and the angle of the lung boundary at the point. The position of the heart model representing the heart region is determined based on the corners by aligning certain points on the heart model with the corners. For example, point 1 of the heart model can be aligned with the corner detected for lung contour 1 and point 17 of the heart model can be aligned with the corner detected for lung contour 2.

Figure 3A:
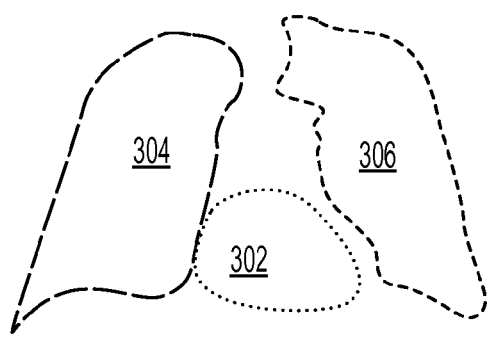
FIGS. 3A-3D illustrate examples of tuning the position of the heart region.
Figure 3B:
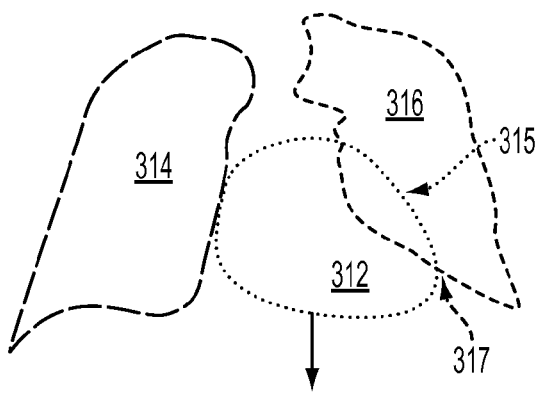
Figure 3C:
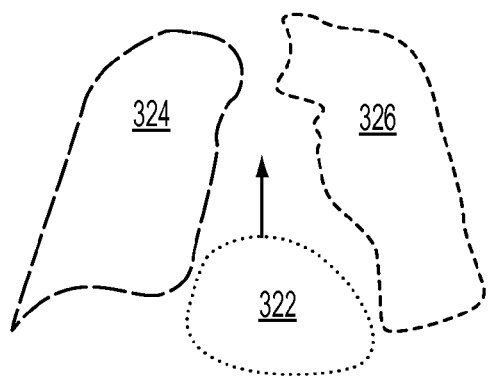
Figure 3D:
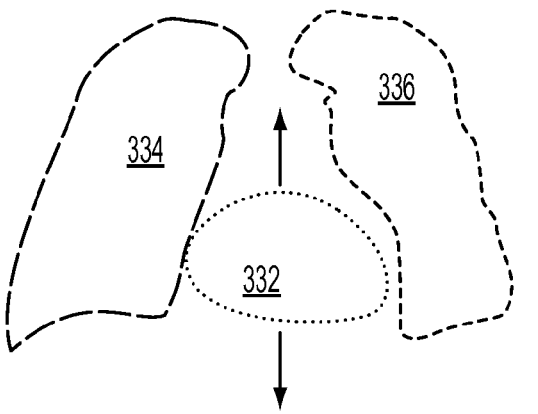

At step 106, the size of the heart region is scaled and the position of the heart region is tuned based on the relative position of the heart region and the lung contours. The size of the heart can be estimated based on the distance between the corners of the lung contours, and the size of the heart region is scaled accordingly. After the heart model representing the heart region is scaled, the position of the heart model is tuned according to the left and right lung boundaries. FIGS. 3A-3D illustrate examples of tuning the position of the heart region. FIG. 3A shows a heart region 302 at an acceptable position relative to lung contours 1 and 2 (304 and 306), which is determined by the percentage of overlapped region of heart region 302 with the lung contours 304 and 306 and the relative position of heart region 302 and lung contours 304 and 306. In the case of FIG. 3A the position of the heart region 302 requires no further tuning. FIG. 3B illustrates a case in which the heart region 312 overlaps with lung contour 2 (316). In order to tune the position of the heart region 312 relative to lung contours 1 and 2 (314 and 316) to correct the overlap, the overlap of the heart region 312 and lung contour 2 (316) is estimated. If the overlap is large enough, the heart region 312 can be moved downward relative to lung contours 1 and 2 (314 and 316) by aligning point 15 (313) on the heart model to the estimated corner (317) on the boundary of lung 2 (316). FIG. 3C illustrates a case in which the heart region 322 is positioned too low with respect to lung contours 1 and 2 (324 and 326). This problem can be determined based on the relative position of the heart region 322 to lung contour 1 (324), and the position of the heart region 322 can be tuned such that the heart region 322 is moved upward relative to lung contours 1 and 2 (324 and 326). FIG. 3D illustrates a case in which the position of the heart model 332 is tuned relative to lung contours 1 and 2 (334 and 336), however the heart model needs further scaling in the vertical direction. Although horizontal scaling and position tuning of the heart model 332 is performed at this step, vertical scaling is accomplished in later method steps.

Returning to FIG. 1, at step 108, the initial heart region boundary resulting from steps 104 and 106 is separated into left, right, upper and lower portions. The boundary of the heart region is separated the four portions (left, right, upper and lower) such that the left portion is the portion of the boundary adjacent to the left lung, the right portion is the portion of the boundary adjacent to the right lung, and the upper and lower portions are portions of the boundary between the left and right portions on the top and bottom of the heart region, respectively. These portions of the heart region boundary can be adjusted independently of each other as described in the following method steps.

Figure 4:
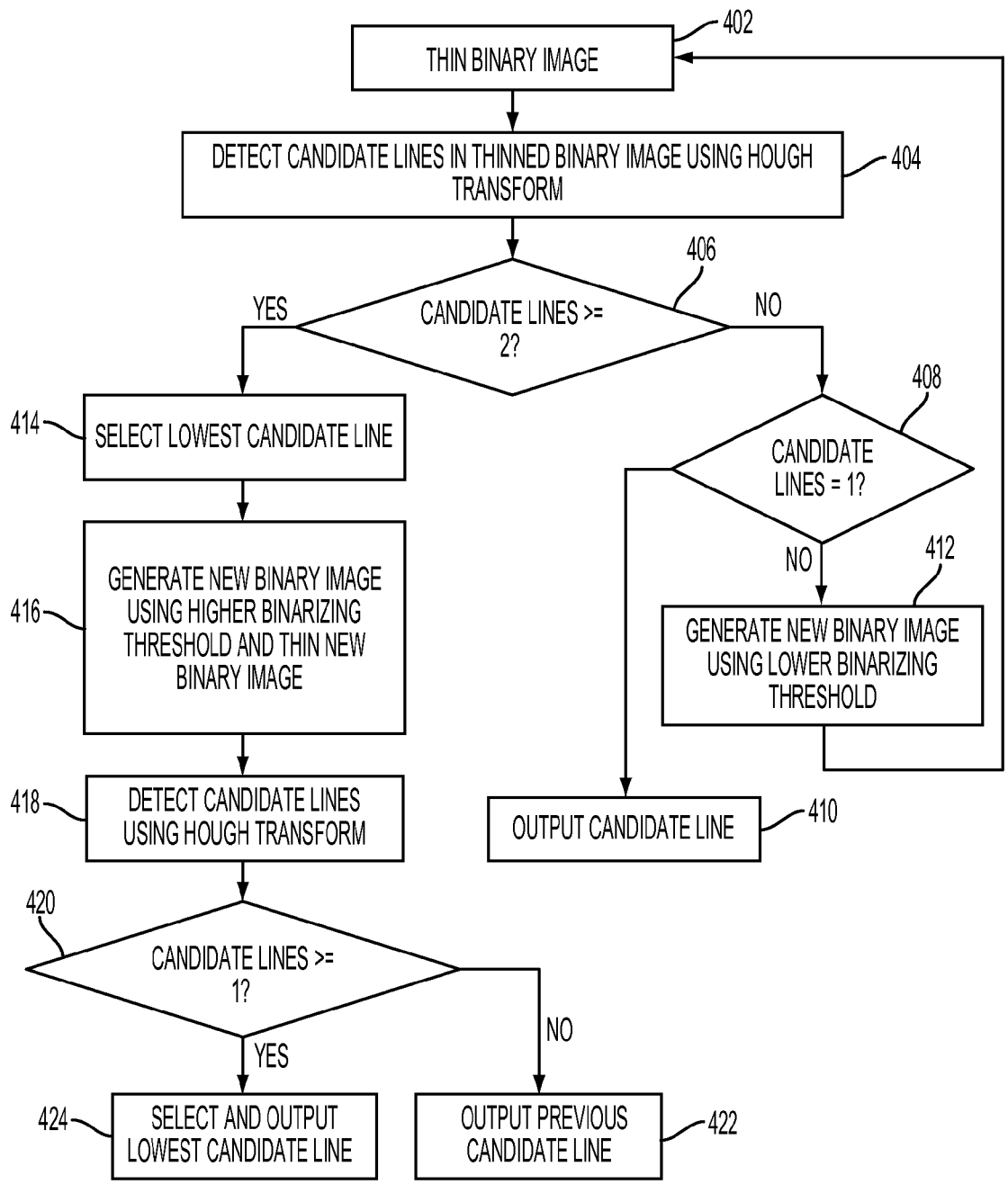
FIG. 4 illustrates a method for detecting a lower boundary of the heart region according to an embodiment of the present invention.

At step 110, a lower boundary of the heart region is detected using an edge enhanced image and a Hough transform. FIG. 4 illustrates a method for detecting a lower boundary of the heart region according to an embodiment of the present invention. Accordingly, FIG. 4 illustrates a method for performing step 110 of FIG. 1. The lower boundary of the heart region is detected to further refine the initial heart boundary. The lower boundary of the heart region is detected utilizing a gradient image in the horizontal direction of a region of interest of the chest X-ray radiograph including the lower portion of the heart region. The gradient image of the region of interest is binarized using a certain binarizing threshold resulting in a binary image. For example, the gradient image can be binarized by setting a threshold of 100 after normalizing the image's gray level to 0-255.

Figure 5:
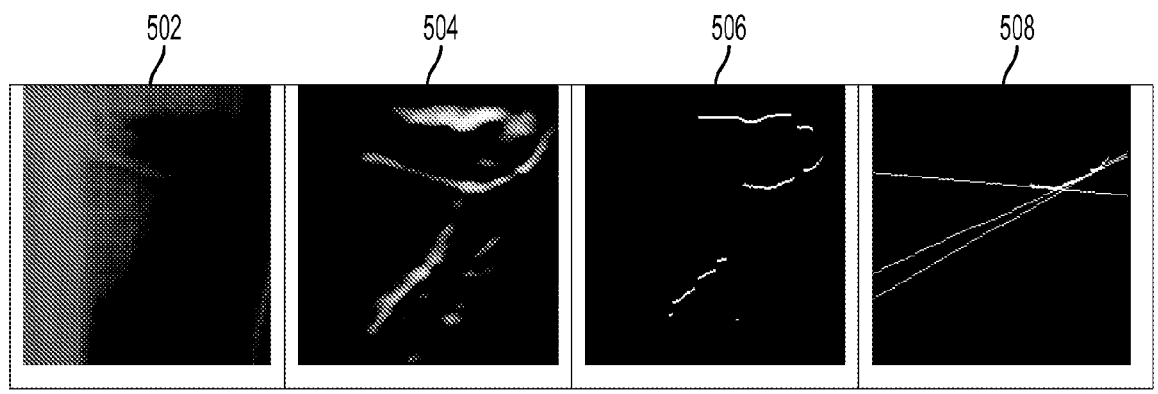
FIG. 5 illustrates exemplary results of various steps of the method of detecting of the lower boundary of the heart region.

At step 402, the binary image is thinned. The binary image is thinned such that each curve segment in the thinned binary image has a thickness of one pixel. There are various well know image processing methods capable of performing such a thinning operation. FIG. 5 illustrates exemplary results of various steps of the method of detecting of the lower boundary of the heart region. As illustrated in FIG. 5, image 502 shows the cropped region of interest, image 504 shows the gradient image of the region of interest, and image 506 shows the thinned binary image.

Returning to FIG. 4, at step 404, a Hough transform is used to detect candidate lines in the thinned binary image. The Hough transform may detect other lines in the thinned binary image, in addition to the lower heart boundary. For example, the Hough transform can detect lines from the stomach, especially when there is gas in the stomach. Some slant boundary of the left lung may also contribute to lines detected by the Hough transform in the thinned binary image. Of the lines detected in the thinned binary image, at most three lines whose length is greater than a threshold value (e.g., 15 pixels) are selected as candidates for the lower boundary of the heart region. If there are more than three lines that whose length is greater than the threshold value, the three lowest lines can be selected as the candidates. Image 508 of FIG. 5 shows three candidate lines detected in a thinned binary image using the Hough transform.

At step 406, it is determined whether the number of candidate lines detected is greater than or equal to two. If the number of candidate lines is not greater than or equal to two (i.e., 0 or 1 detected candidate lines), the method proceeds to step 408. If the number of candidate lines is greater than or equal to two (i.e., 2 or 3 detected candidate lines), the method proceeds to step 414.

At step 408, it is determined whether the number of candidate lines is equal to one. If the number of candidate lines is equal to one at step 408, the method proceeds to step 410. At step 410, there is only one detected candidate line, and the detected candidate line is output as the lower boundary of the heart region. If the number of candidate lines is not equal to one (i.e., 0 detected candidate lines) at step 408, the method proceeds to step 412. At step 412, a new binary image of the gradient of the region of interest is generated using a lower binarizing threshold than the previous binary image. The method then returns to step 402, and repeats.

At step 414, when 2 or 3 candidate lines are detected, the candidate line having the lowest position in the thinned binary image is selected as the lower heart region boundary. The selected lower heart region boundary can be stored in memory or storage of a computer system implementing the method.

At step 416, a new binary image of the gradient of the region of interest is generated using a higher binarizing threshold than the previous binary image. The new binary image is then thinned. As described at step 402, the new binary image is thinned such that each line in the binary image has a thickness of 1 pixel.

At step 418, a Hough transform is used to detect lines in the thinned binary image generated at step 416. Lines detected in the thinned binary image whose length is greater than the threshold value are considered candidate lines.

At step 420, it is determined whether the number of candidate lines detected in the thinned binary image at step 418 is greater than or equal to one. If the number of detected candidate lines is not greater than or equal to one (i.e., no candidate lines are detected in the newly generated binary image), the method proceeds to step 422. If the number of candidate lines detected in greater than or equal to one (i.e., one or more candidate lines are detected in the newly generated binary image), the method proceeds to step 424. At step 422, if no candidate lines are detected in the newly generated binary image, the lower heart region boundary selected at step 414 is output as the lower heart region boundary. At step 424, if one or more candidate lines are detected in the newly generated binary image, the lowest one of the detected candidate lines in the newly generate binary image is selected as the lower heart region boundary and output.

As described above, FIG. 4 illustrates a method for estimating the lower heart region boundary. This method outputs the location of a line which estimates the lower heart region boundary. However, since the lower boundary of the heart region is typically not a straight line, this line is only an approximate position. An additional tracing scheme can be used to find a more accurate position of the heart bottom around the approximate position output by the method of FIG. 4. For example, each pixel in the line output as the lower heart region boundary can be adjusted within a certain range of that pixel (e.g., about 10 pixels up or down) based on minimizing a potential energy which is a function of one or more image characteristics. The potential energy can be based on a weighted sum of image characteristics such as intensity difference between inside and outside of the heart region, the image gradient, and intensity difference between inside the heart region and the heart region center.

Returning to FIG. 1, at step 112, left and right portions of the heart region boundary are registered with corresponding portions of the left and right lung boundaries, respectively. Portions of the lung boundaries coincide with the heart boundary. Accordingly, the lung boundaries can be utilized to adjust the position of the heart region boundary. The left and right portions of the heart region boundary can be registered piece wisely to corresponding portions of the lung boundaries. The lateral (left and right) portions of the heart boundary are registered to the corresponding segments on the lung boundaries instead of using the lung boundaries directly. The detected heart region boundary will be smooth and have a reasonable shape.

Figure 6:
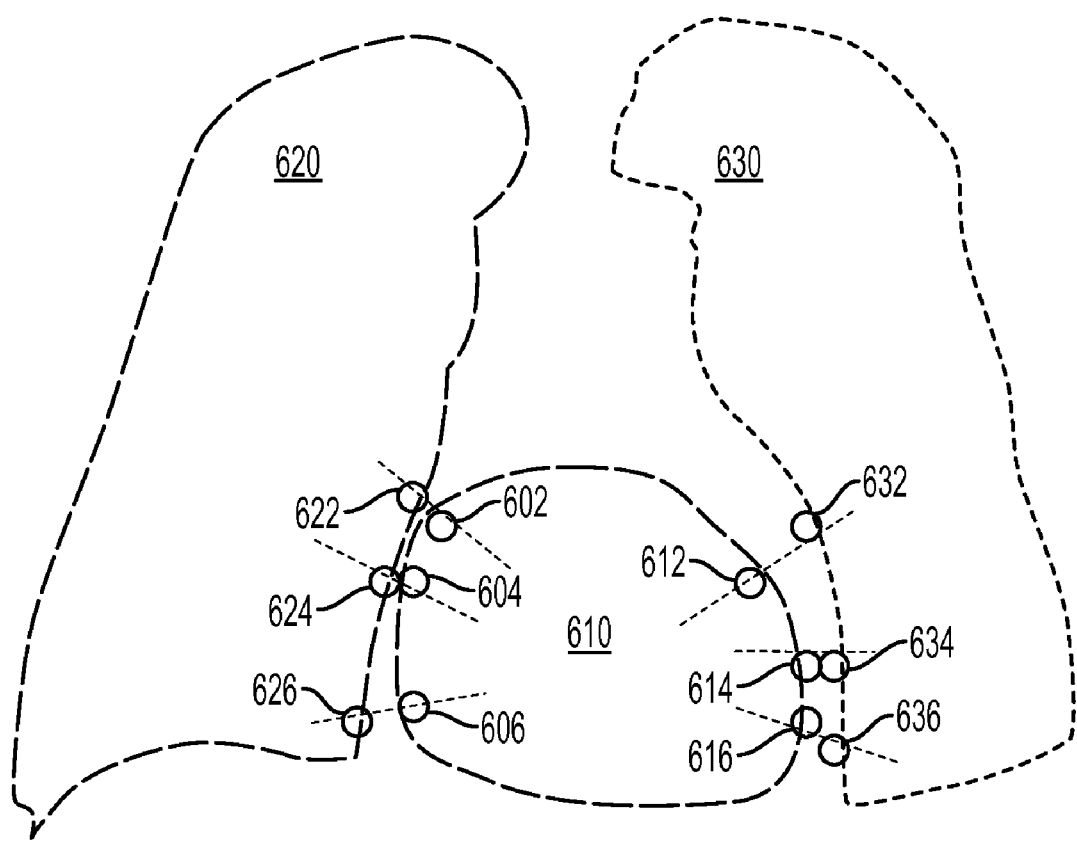
FIG. 6 illustrates determining segments of lung boundaries which correspond to left and right portions of a heart region boundary.

In order to register the left and right portions of the heart region boundary to the corresponding portions of the lung boundaries, the corresponding portions on the lung boundaries must first be determined. FIG. 6 illustrates determining segments of the lung boundaries 620 and 630 which correspond to the left and right portions of the heart region boundary 610. As illustrated in FIG. 6, the corresponding segments on the left and right lung boundaries 620 and 630 can be determined by using three straight lines normal to the heart region boundary 610 from three selected points (602, 604, 606) and (612, 614, and 616) on each of the left and right portions of the heart region boundary 610, respectively. The three intersection points (622, 624, 626) and (632, 634, 636) on the left and right lung boundaries 620 and 630 are used to register the left and right portions of the heart boundary 610, respectively.

Figure 7:
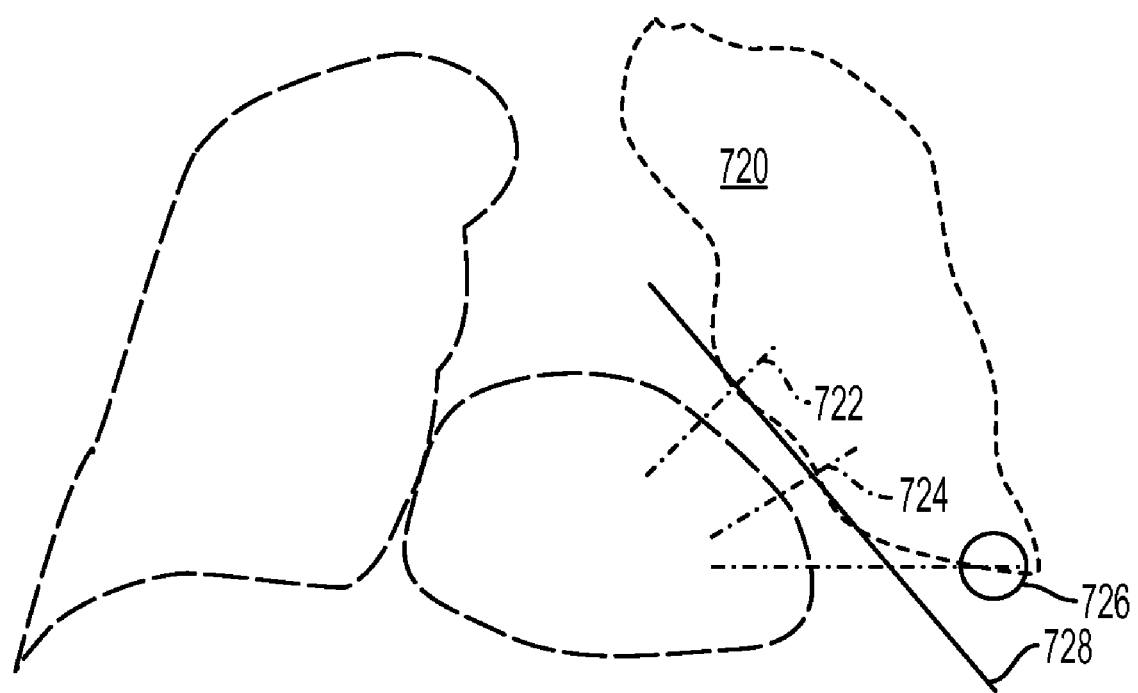
FIG. 7 illustrates a potential problem that may arise when determining the segments of the lung boundaries which correspond to the left and right portions of the heart region boundary.

FIG. 7 illustrates a potential problem that may arise when determining the segments of the lung boundaries which correspond to the left and right portions of the heart region boundary. As illustrated in FIG. 7, an intersection point 726 on a lung boundary 720 is on the bottom of the lung. In order to prevent this problem, the other intersection points 722 and 724 detected on the lung boundary 720 are used to determine whether the point 626 is on the bottom the lung boundary 720. A line 728 is defined by the points 722 and 724 on the lung boundary 720, and if the other intersection point 726 is located a significant distance from the line 722, the intersection point 726 is determined to be located on the bottom the lung boundary 720. When an intersection point 726 is determined to be located on the bottom of the lung boundary 720, the intersection point is discarded and not used to register the corresponding portion of the heart region boundary.

The left and right portions of the heart region boundary can be registered to the corresponding lung boundary segments using the three pairs of corresponding points determined for each of the left and right portions of the heart region boundary. Referring to FIG. 6, the three points 602, 604, and 606 on the left portion of the heart region boundary 610 are registered to the three corresponding intersection points 622, 624, 626 on the lung boundary 620, respectively, and the three points 612, 614, and 616 on the right portion of the heart region boundary 610 are registered to the three corresponding intersection points 632, 634, and 636 on the lung boundary 630, respectively. As described above at step 108 of FIG. 1, the heart region boundary is divided into four portions (left, right, upper, and lower), and a rigid transform can be assumed for each portion. A three point rigid registration can be used to register the corresponding points. The following equations are used to register three pairs of the points, from $(x_1, y_1)$, $(x_2, y_2)$, and $(x_3, y_3)$ to $(u_1, v_1)$, $(u_1, v_1)$, and $(u_1, v_1)$:

$$\begin{cases} x_1 = au_1 + bv_1 + c \\ x_2 = au_2 + bv_2 + c \\ x_3 = au_3 + bv_3 + c \end{cases} \begin{cases} y_1 = du_1 + ev_1 + f \\ y_2 = du_2 + ev_2 + f \\ y_3 = du_3 + ev_3 + f \end{cases}$$

The registration parameters a, b, c, d, e, f can be calculated from the two sets of equations. This can be expressed in matrix form as:

$$\begin{bmatrix} x_1 & x_2 & x_3 \\ y_1 & y_2 & y_3 \\ 1 & 1 & 1 \end{bmatrix} = \begin{bmatrix} a & b & c \\ d & e & f \\ 0 & 0 & 1 \end{bmatrix} \begin{bmatrix} u_1 & u_2 & u_3 \\ v1 & v_2 & v_3 \\ 1 & 1 & 1 \end{bmatrix}$$

-continued $$A = TB$$
$$T = AB^{-1}$$

Figure 8:
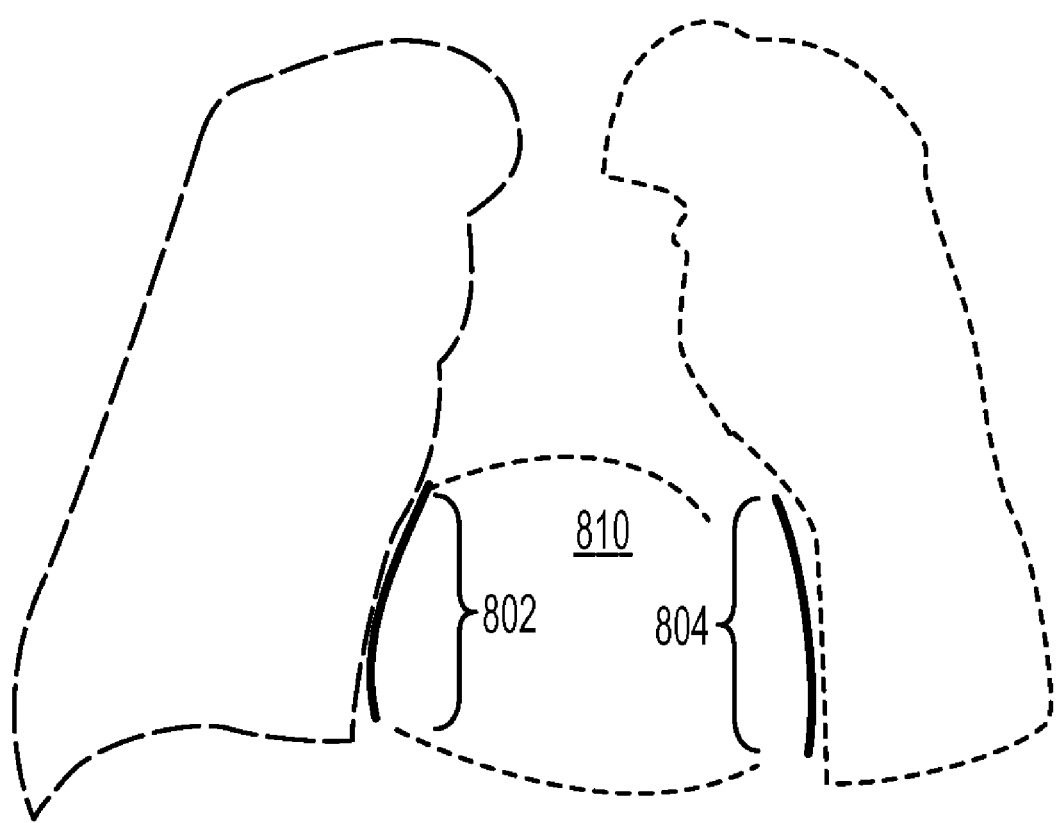
FIG. 8 illustrates the example of FIG. 6 after registration of the left and right portions of the heart region boundary.

Matrix T is the transformation matrix, which is used to transform the points $(x_1, y_1)$, $(x_2, y_2)$, and $(x_3, y_3)$ of the left or right portion of the heart region boundary to the new positions $(u_1, v_1)$, $(u_1, v_1)$, and $(u_1, v_1)$ corresponding to the intersection points on the lung boundary. FIG. 8 illustrates the example of FIG. 6 after registration of the left and right portions 802 and 804 of the heart region boundary 810.

Returning to FIG. 1, at step 114, the upper and lower portions of the heart region boundary are adjusted based on the left and right portions in order to form a smooth contour. After registering the left and right portions of the heart region boundary to the corresponding portions of the lung boundaries, the upper and lower portions of the heart region boundary may need some modification, i.e. shrink, enlargement, rotation, in order to smoothly connect the left and right portions. For example, referring to FIG. 8, the left and right portions 802 and 804 of the heart region boundary 810 are registered to the corresponding portions of the lung boundaries. The upper and lower portions 806 and 808 of the heart region boundary 810 need to be enlarged and rotated to generate a complete and smooth heart contour. Furthermore, additional techniques, such as principle component analysis, may be applied to ensure that the heart shape is reasonable as compared with an average heart shape. Such techniques, which can increase conformity and smoothness of shape of the heart region boundary, are well known in the art.

Returning to FIG. 1, at step 116 the heart region boundary resulting from step 112 is output. For example, the heart region boundary can be displayed as an image on a display of a computer system, stored in a memory or storage of a computer system. The segmented heart region can be used in other image processing methods implemented on the computer system. For example, the heart region can be used in nodule detection methods in order to perform separate nodule detection in the segmented heart region than in the lung regions.

Figure 9:
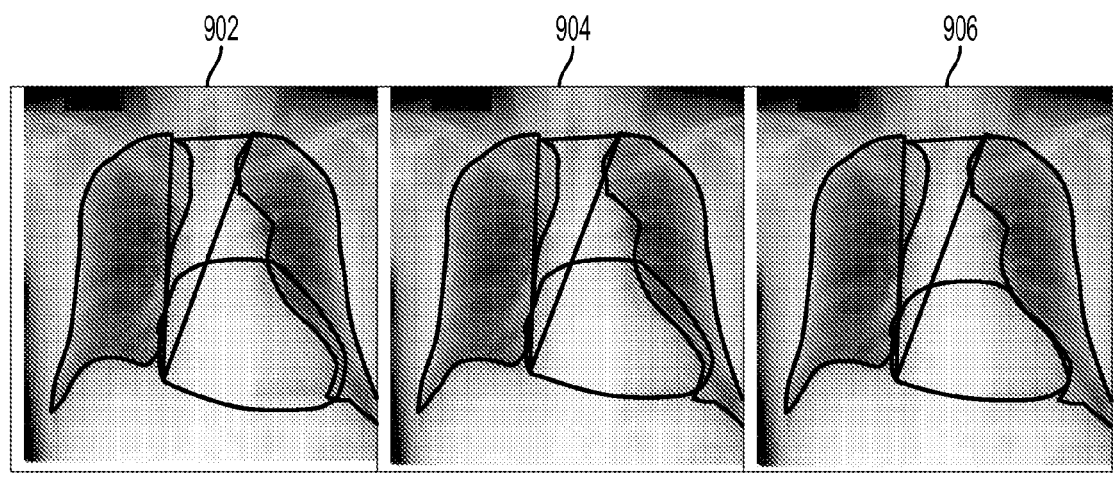
FIG. 9 illustrates exemplary results at various steps of the method of segmenting a heart region in a chest X-ray radiograph of FIG. 1.
Figure 10:
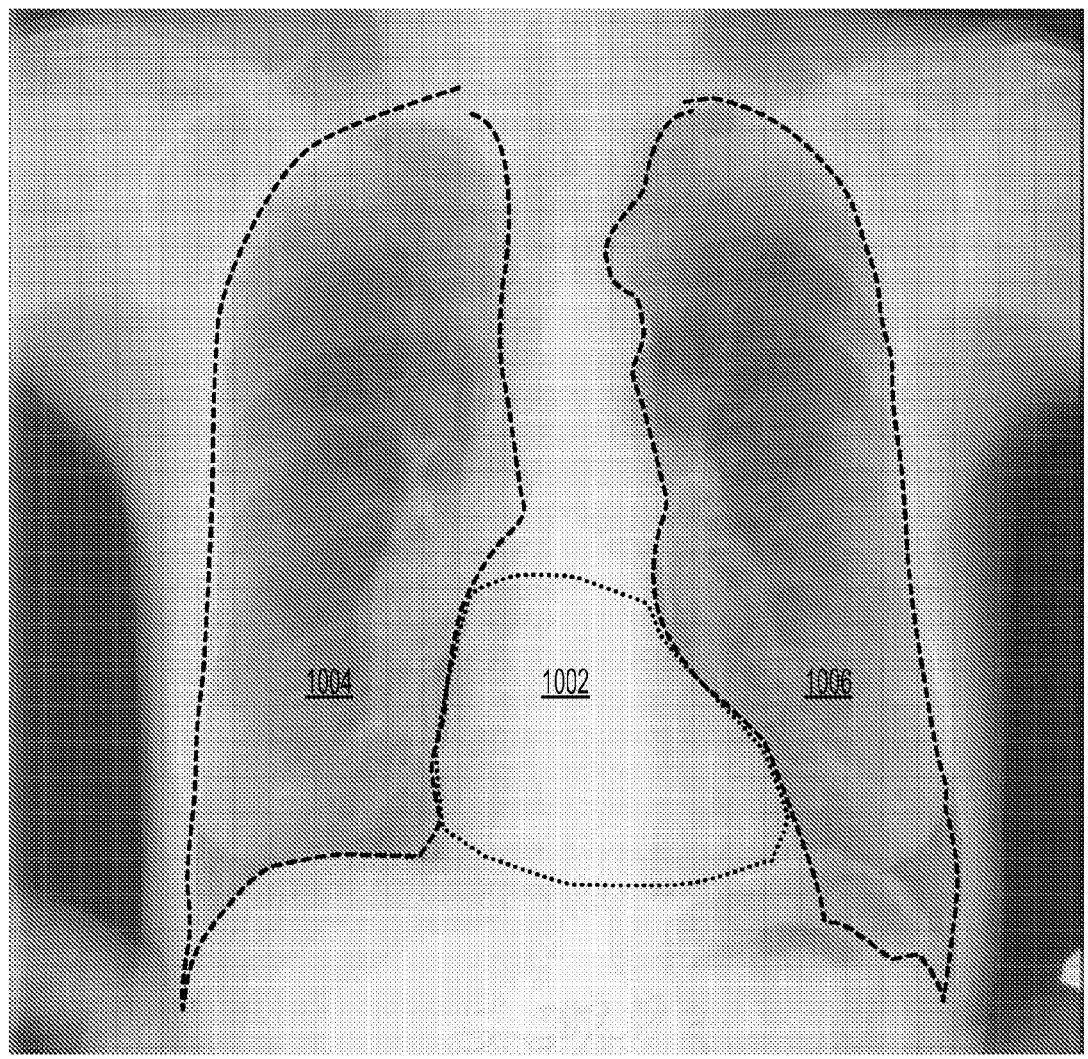
FIG. 10 illustrates exemplary results of the method of segmenting a heart region in a chest X-ray radiograph of FIG. 1.

FIG. 9 illustrates exemplary results at various steps of the above described method for segmenting a heart region in a chest X-ray radiograph. Image (a) of FIG. 9 shows results of estimating the scale and position of the heart region model (step 106 of FIG. 1). Image (b) of FIG. 9 shows results of the detecting the lower heart region boundary (step 110). Image (c) of FIG. 9 show results of registering the left and right portions of the heart region boundary to the corresponding portions of the lung boundaries. FIG. 10 illustrates exemplary results of the above described method for segmenting a heart region in a chest X-ray radiograph. As illustrated in FIG. 10, the heart region 1002 is successfully segmented and aligned with lung regions 1004 and 1006.

Figure 11:
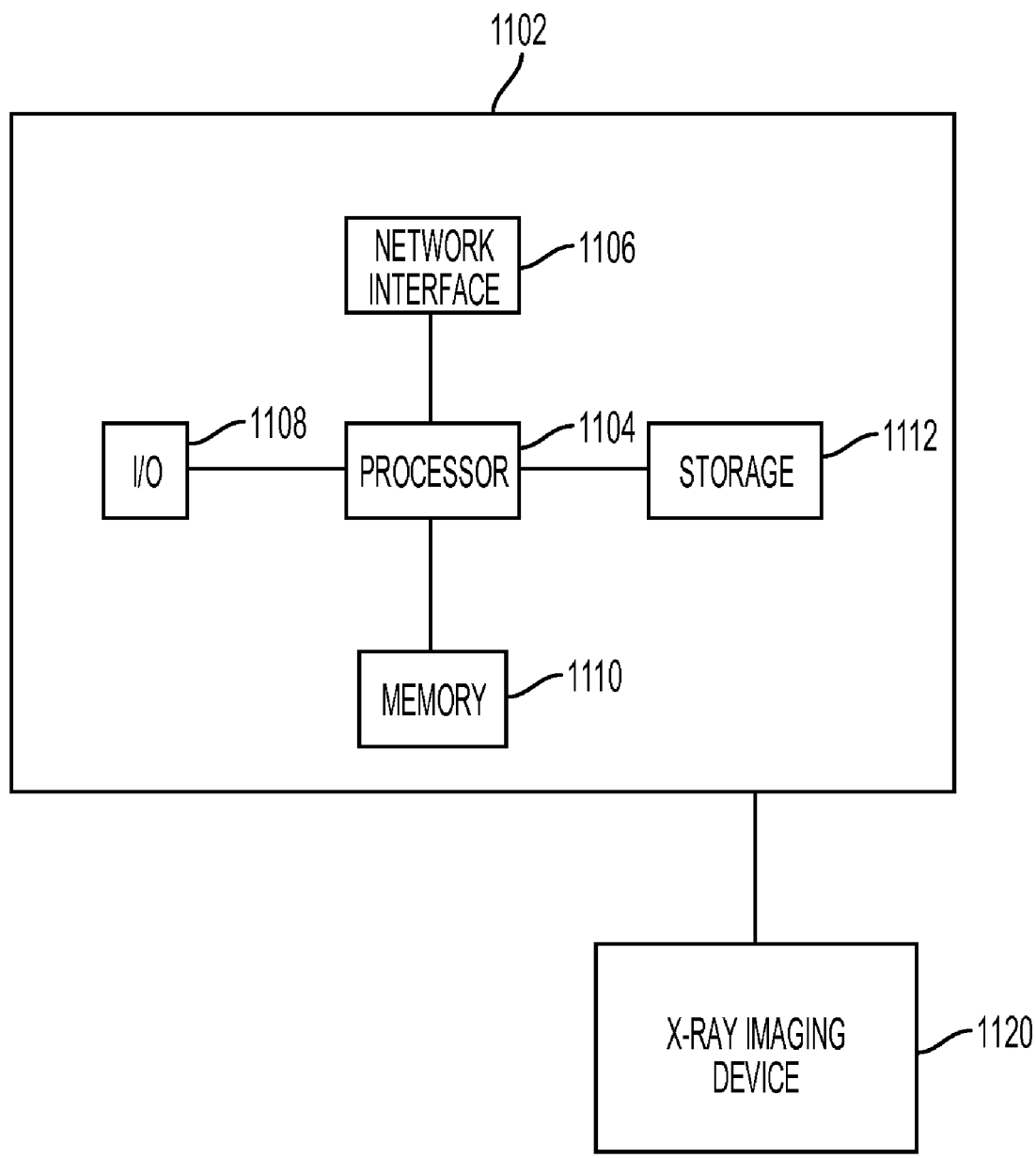
FIG. 11 is a high level block diagram of a computer capable of implementing the present invention.

The above-described method for segmenting a heart region in a chest X-ray radiograph may be implemented on a computer using well-known computer processors, memory units, storage devices, computer software, and other components. A high level block diagram of such a computer is illustrated in FIG. 11. Computer 1102 contains a processor 1104 which controls the overall operation of the computer 1102 by executing computer program instructions which define such operation. The computer program instructions may be stored in a storage device 1112 (e.g., magnetic disk) and loaded into memory 1110 when execution of the computer program instructions is desired. Thus, an application for segmenting a heart region in a chest X-ray radiograph may be defined by the computer program instructions stored in the memory 1110 and/or storage 1112 and controlled by the processor 1104 executing the computer program instructions. An X-ray imaging device 1120 can be connected to the computer 1102 to input X-ray radiographs to the computer 1102. It is possible to implement the X-ray imaging device 1120 and the computer 1102 as one device. It is also possible that the X-ray imaging device 1120 and the computer 1102 communicate wirelessly through a network. The computer 1102 also includes one or more network interfaces 1106 for communicating with other devices via a network. The computer 1102 also includes other input/output devices 1108 that enable user interaction with the computer 1102 (e.g., display, keyboard, mouse, speakers, buttons, etc.) One skilled in the art will recognize that an implementation of an actual computer could contain other components as well, and that FIG. 11 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for segmenting a heart region in a chest X-ray radiograph, comprising:
    generating a heart region boundary based on lung boundaries in the chest X-ray radiograph and an average heart region model;
    determining a location of a lower boundary of the heart region boundary;
    registering left and right portions of the heart region boundary to corresponding portions of the lung boundaries; and
    adjusting upper and lower portions of the heart region boundary based on the left and right portions of the heart region boundary.

2. The method of claim 1, wherein said step of generating a heart region boundary comprises:
    detecting a corner point on each of left and right lung boundaries;
    estimating the heart region boundary by aligning points on the average heart model with the corner points on the left and right lung boundaries;
    scaling the heart region boundary based on a distance between the corner points on the left and right lung boundaries; and
    tuning a vertical position of the heart region boundary based on overlap between the heart region boundary and the left and right lung boundaries.

3. The method of claim 1, wherein said step of determining a location of a lower boundary of the heart region boundary comprises:
    determining the location of said lower boundary by detecting lines in said chest X-ray radiograph using a Hough transform.

4. The method of claim 1 wherein said step of determining a location of a lower boundary of the heart region boundary comprises:

generating a gradient image in a horizontal direction of a region of interest of said chest X-ray radiograph, said region of interest including a lower portion of the heart region boundary;
generating a binary image of said gradient image by binarizing said gradient image;
thinning said binary image;
detecting one or more candidate lines using a Hough transform of the thinned binary image; and
selecting one of the candidate lines as the lower boundary of the heart region boundary.

5. The method of claim 4, wherein said step of detecting one or more candidate lines using a Hough transform of the thinned binary image comprises:
detecting lines in the thinned binary image using the Hough transform; and
determining a line to be a candidate line when the line is longer than a threshold.

6. The method of claim 4, wherein said step of selecting one of the candidate lines as the lower boundary of the heart region comprises:
selecting a lowest candidate line in the thinned binary image as the lower boundary of the heart region.

7. The method of claim 6, wherein said step of selecting one of the candidate lines as the lower boundary of the heart region further comprises:
generating a new binary image of said gradient image by binarizing said gradient image using a higher binarization threshold than said binary image;
thinning said new binary image;
determining whether any candidate lines are detected in the thinned new binary image using a Hough transform;
if one or more candidate lines are detected in the thinned new binary image, selecting a lowest candidate line in the thinned binary image as the lower boundary of the heart region.

8. The method of claim 4, wherein said step of determining a location of a lower boundary of the heart region boundary further comprises:
adjusting each point in the lower boundary of the heart region boundary to minimize an energy function based on an intensity difference between an inside and an outside of the heart region boundary, a gradient at each point, and an intensity difference between the inside of the heart region boundary and a center of the heart region boundary.

9. The method of claim 1, wherein said step of registering left and right portions of the heart region boundary to corresponding portions of the lung boundaries comprises:
determining intersection points on each of left and right lung boundaries that correspond to points on the left and right portions of the heart region boundary, respectively; and
calculating registration parameters to transform the points on each of the left and right portions of the heart boundary to the corresponding points on each of the left and right lung boundaries, respectively.

10. The method of claim 1, wherein said step of adjusting upper and lower portions of the heart region boundary based on the left and right portions of the heart region boundary comprises:
at least one of shrinking, enlarging, and rotating said upper and lower portions of the heart region boundary such that the upper, lower, left and right portions of the heart region boundary form a smooth contour.

11. The method of claim 1, further comprising:
outputting the heart region boundary.

12. The method of claim 1, further comprising:
detecting nodules within the heart region boundary in said chest X-ray radiograph separately from lung regions in said chest X-ray radiograph.

13. An apparatus for segmenting a heart region in a chest X-ray radiograph, comprising:
means for generating a heart region boundary based on lung boundaries in the chest X-ray radiograph and an average heart region model;
means for determining a location of a lower boundary of the heart region boundary;
means for registering left and right portions of the heart region boundary to corresponding portions of the lung boundaries; and
means for adjusting upper and lower portions of the heart region boundary based on the left and right portions of the heart region boundary.

14. The apparatus of claim 13, wherein said means for generating a heart region boundary comprises:
means for detecting a corner point on each of left and right lung boundaries;
means for estimating the heart region boundary by aligning points on the average heart model with the corner points on the left and right lung boundaries;
means for scaling the heart region boundary based on a distance between the corner points on the left and right lung boundaries; and
means for tuning a vertical position of the heart region boundary based on overlap between the heart region boundary and the left and right lung boundaries.

15. The apparatus of claim 13, wherein said means for determining a location of a lower boundary of the heart region boundary comprises:
means for generating a gradient image in a horizontal direction of a region of interest of said chest X-ray radiograph, said region of interest including a lower portion of the heart region boundary;
means for generating a binary image of said gradient image by binarizing said gradient image;
means for thinning said binary image;
means for detecting one or more candidate lines using a Hough transform of the thinned binary image; and
means for selecting one of the candidate lines as the lower boundary of the heart region boundary.

16. The apparatus of claim 15, wherein said means for selecting one of the candidate lines as the lower boundary of the heart region comprises:
means selecting a lowest candidate line in the thinned binary image as the lower boundary of the heart region.

17. The apparatus of claim 15, wherein said means for determining a location of a lower boundary of the heart region boundary further comprises:
means for adjusting each point in the lower boundary of the heart region boundary to minimize an energy function based on an intensity difference between an inside and an outside of the heart region boundary, a gradient at each point, and an intensity difference between the inside of the heart region boundary and a center of the heart region boundary.

18. The apparatus of claim 13, wherein said means for registering left and right portions of the heart region boundary to corresponding portions of the lung boundaries comprises:
means for determining intersection points on each of left and right lung boundaries that correspond to points on the left and right portions of the heart region boundary, respectively; and means for calculating registration parameters to transform the points on each of the left and right portions of the heart boundary to the corresponding points on each of the left and right lung boundaries, respectively.

19. A computer readable medium encoded with computer executable instructions for segmenting a heart region in a chest X-ray radiograph, the computer executable instructions defining steps comprising:

generating a heart region boundary based on lung boundaries in the chest X-ray radiograph and an average heart region model;

determining a location of a lower boundary of the heart region boundary;

registering left and right portions of the heart region boundary to corresponding portions of the lung boundaries; and adjusting upper and lower portions of the heart region boundary based on the left and right portions of the heart region boundary.

20. The computer readable medium of claim 19, wherein said the computer executable instructions defining the step of generating a heart region boundary comprise computer executable instructions defining the steps of:

detecting a corner point on each of left and right lung boundaries;

estimating the heart region boundary by aligning points on the average heart model with the corner points on the left and right lung boundaries;

scaling the heart region boundary based on a distance between the corner points on the left and right lung boundaries; and tuning a vertical position of the heart region boundary based on overlap between the heart region boundary and the left and right lung boundaries.

21. The computer readable medium of claim 19, wherein the computer executable instructions defining the step of determining a location of a lower boundary of the heart region boundary comprise computer executable instructions defining the steps of:

generating a gradient image in a horizontal direction of a region of interest of said chest X-ray radiograph, said region of interest including a lower portion of the heart region boundary;

generating a binary image of said gradient image by binarizing said gradient image;

thinning said binary image;

detecting one or more candidate lines using a Hough transform of the thinned binary image; and selecting one of the candidate lines as the lower boundary of the heart region boundary.

22. The computer readable medium of claim 21, wherein the computer executable instructions defining the step of detecting one or more candidate lines using a Hough transform of the thinned binary image comprise computer executable instructions defining the steps of:

detecting lines in the thinned binary image using the Hough transform; and determining a line to be a candidate line when the line is longer than a threshold.

23. The computer readable medium of claim 21, wherein the computer executable instructions defining the step of selecting one of the candidate lines as the lower boundary of the heart region comprise computer executable instructions defining the step of:

selecting a lowest candidate line in the thinned binary image as the lower boundary of the heart region.

24. The computer readable medium of claim 21, wherein the computer executable instructions defining the step of determining a location of a lower boundary of the heart region boundary further comprise computer executable instructions defining the step of:

adjusting each point in the lower boundary of the heart region boundary to minimize an energy function based on an intensity difference between an inside and an outside of the heart region boundary, a gradient at each point, and an intensity difference between the inside of the heart region boundary and a center of the heart region boundary.

25. The computer readable medium of claim 19, wherein the computer executable instructions defining the step of registering left and right portions of the heart region boundary to corresponding portions of the lung boundaries comprise computer executable instructions defining the steps of:

determining intersection points on each of left and right lung boundaries that correspond to points on the left and right portions of the heart region boundary, respectively; and calculating registration parameters to transform the points on each of the left and right portions of the heart boundary to the corresponding points on each of the left and right lung boundaries, respectively.

* * * * *